United States Patent [19]

Shimomura

[11] 3,958,459

[45] May 25, 1976

[54] BAROMETRIC ALTIMETER

[76] Inventor: Naonobu Shimomura, 13-8 Sakuragaoka-cho, Shibuya, Tokyo, Japan

[22] Filed: Oct. 26, 1973

[21] Appl. No.: 410,116

[30] Foreign Application Priority Data

| | | |
|---|---|---|
| Oct. 28, 1972 | Japan | 47-108314 |
| Jan. 12, 1973 | Japan | 48-6404 |
| Dec. 30, 1972 | Japan | 48-1344 |
| Jan. 12, 1973 | Japan | 48-6405 |
| Feb. 2, 1973 | Japan | 48-13510 |
| Mar. 2, 1973 | Japan | 48-25296 |
| Aug. 27, 1973 | Japan | 48-95952 |

[52] U.S. Cl. .......................... 73/384; 73/DIG. 1; 235/92 MT
[51] Int. Cl.² ............... G01L 7/00; G06F 7/38; G06G 7/00
[58] Field of Search ............ 73/384, 386, 387, 393, 73/DIG. 1; 235/92 MT

[56] References Cited
UNITED STATES PATENTS

| | | | |
|---|---|---|---|
| 3,693,405 | 9/1972 | Shimomura | 73/384 |
| 3,726,138 | 4/1973 | Kosakowski | 73/384 X |
| 3,729,999 | 5/1973 | Shimomura | 73/384 |
| 3,843,872 | 10/1974 | Shimomura | 235/92 MT |

*Primary Examiner*—Richard C. Queisser
*Assistant Examiner*—Daniel M. Yasich
*Attorney, Agent, or Firm*—Staas & Halsey

[57] ABSTRACT

This invention discloses apparatus for linearizing the relation between altitude and an output signal of a sensor which represents the n th power of atmospheric pressure by means of generating a basically exponential signal of a parameter and obtaining the corresponding value of the parameter at which the exponential signal coincides with the output signal of the pressure sensor. This invention also includes means for measuring an accurate altitude by correcting the above linearized value according to the standard atmosphere adopted by the ICAO by means of generating a function for compensating the effect of temperature distribution of the standard atmosphere.

7 Claims, 29 Drawing Figures

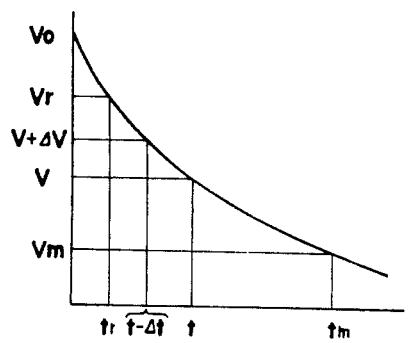
FIG. 1
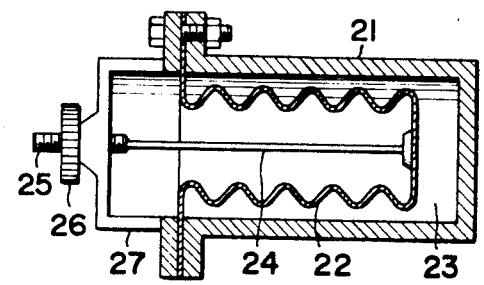
FIG. 2
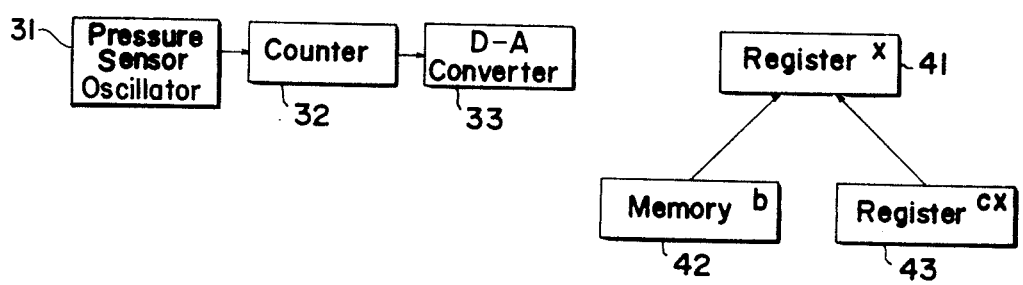
FIG. 3
FIG. 4
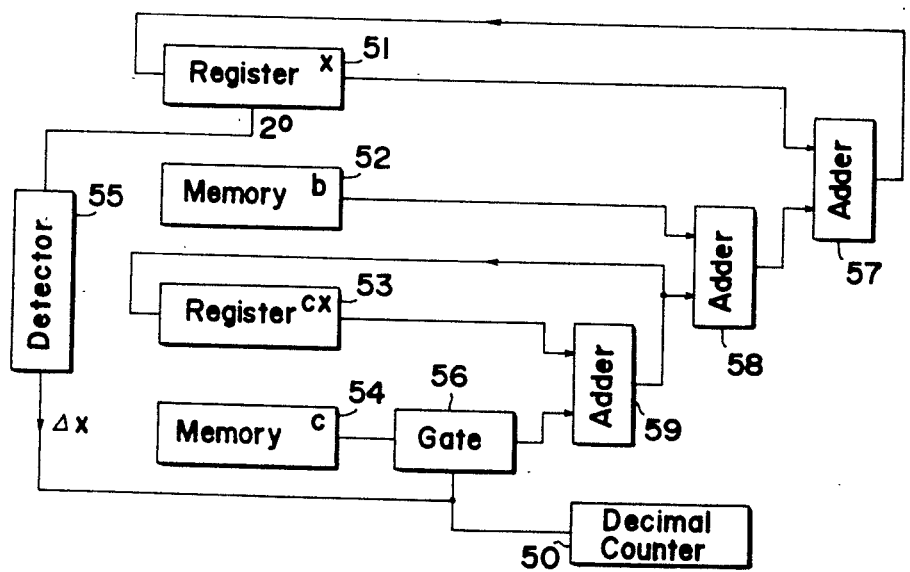
FIG. 5

FIG. 16
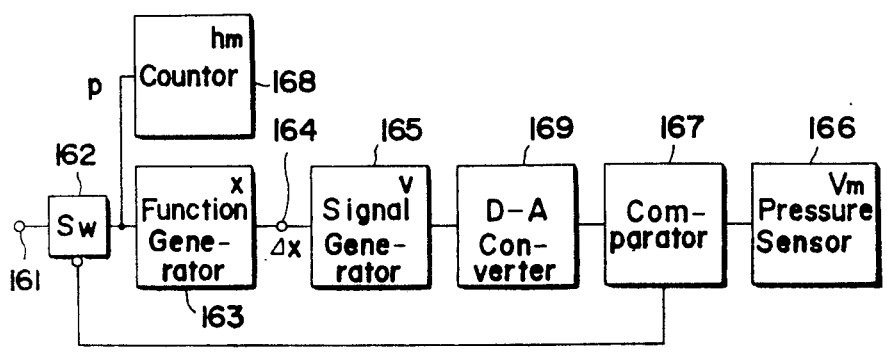
FIG. 17
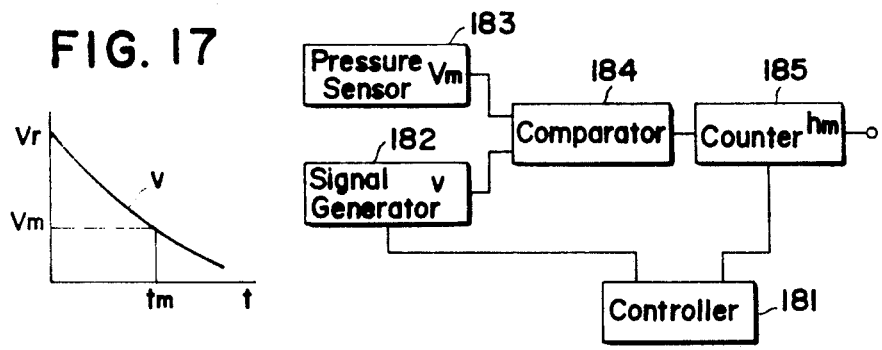
FIG. 18
FIG. 19
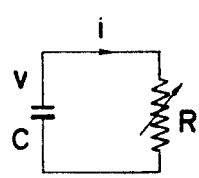
FIG. 20
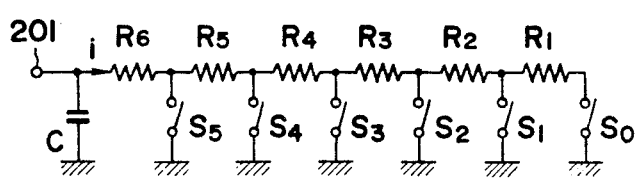
FIG. 21A
FIG. 21B

BAROMETRIC ALTIMETER

BACKGROUND OF THE INVENTION

1. Field of the invention

This invention relates to barometric altimeters, and particularly to those accurate barometric altimeters based on the electronic technology to be used for aircrafts.

2. Description of Prior Art

The principle of barometric altimeters is based on the fact that the atmospheric pressure decreases as the altitude increases, and the altitude is obtained by measuring the atmospheric pressure.

In most of the conventional barometric altimeters, the atmospheric pressure is measured by the deformation of an aneroid capsule due to the change of pressure, and this deformation is indicated after being mechanically magnified by a train of gears. As the deformation is magnified greatly, even slight friction in the mechanism causes an error. Because this error is not proportional to the altitude and does not decrease even at low altitude, it may cause a danger in low altitude flight of an aircraft.

In order that the indicator be graduated in a linear scale, a logarithmic transformation mechanism also providing the mechanical magnification, is necessary and the accuracy needed for this mechanism is very critical.

In those applications where the digital value of altitude is required, such as automatic altitude reporting system, a complex high cost encoder, such as optical type one, has been used.

The applicant has made an invention as is disclosed in the U.S. Pat. No. 3,729,999 in which no mechanical magnification nor logarithmic trans-formation is needed and accurate indication of altitude is obtainable by means of electronic procedures according to the International Civil Aviation Organization's (ICAO) standard atmosphere. Although the above invention is useful where a pressure sensor produces an output signal linearly proportional to the atmospheric pressure of the altitude to be measured, some types of accurate and sensitive pressure sensors do not produce output signals which are directly, or linearly proportional to the atmospheric pressure sensed. Also the above invention is based on a counter oriented philosophy and results in some complexity in the circuitry used.

SUMMARY OF THE INVENTION

The object of this invention is to provide an improved type of barometric altimeter relating to those of the prior art.

An object of this invention is to provide a barometric altimeter which gives a digital indication, consistent with the general trends of digitizing avionic informations.

Another object of this invention is to provide a barometric altimeter suitable to be used in an automatic altitude reporting system or air traffic control system or some type of collision avoidance system where digital information of altitude is essential.

Another object of this invention is to make it possible to construct a barometric altimeter by means of digital technology throughout.

A further object of this invention is to provide a barometric altimeter of improved stability with simplified circuitry. This invention provides a variety of design choices according to the use of the barometric altimeter.

Briefly stated, a non linear pressure sensor, specifically a vibrating type pressure sensor, is used in the barometric altimeter of this invention as well as the linear sensors. An electrical signal basically varied exponentially with respect to a parameter e.g., clocking pulses of a known rate is generated and the value of the parameter at which the above basically exponential signal coincides with the output signal of the pressure sensor gives the logarithmic transformation. A function generator of exponential or logarithmic type is used for correcting the above parameter to represent the accurate altitude according to the ICAO standard atmosphere. When the basically exponential electrical signal is a quasi-exponential waveform, a linear function generator, represented by a counter, can be used in place of the exponential function generator. Also disclosed in this invention is a simplified and reliable counter circuitry which is controlled to generate a non-linear function for correcting the temperature effect. Simple and accurate methods for generating exponential electrical signals and exponential functions to be used for this invention are described.

BRIEF DESCRIPTION OF THE DRAWINGS

This invention will be more fully understood by the following description and the attached drawings, in which:

FIG. 1 shows the graph of the electrical signal for explaining the principle of this invention.

FIG. 2 shows an example of a vibrating type pressure sensor;

FIG. 3 shows an example of a measuring circuit using the pressure sensor shown in FIG. 2;

FIG. 4 shows the general principle of the generation of the exponential function for this invention;

FIG. 5 shows an embodiment of the function generator;

FIG. 16 shows another embodiment according to the invention utilizing the function generator of FIG. 14 and the signal generator of FIG. 15;

FIG. 17 shows the principle of another embodiment of this invention;

FIG. 18 shows the block diagrm of the other embodiment of this invention according to FIG. 17;

FIG. 19 shows the principle to generate the quasiexponential signal $v$; of the equation (46)

FIG. 20 shows a practical circuit to generate the quasi-exponential signal v of the equation (46);

FIGS. 21A and B are timing charts of the control signal to generate the quasi-exponential signal $v$ of the equation (46);

DETAILED DESCRIPTION OF THE PREFERRED EMBODIMENTS

Figure 6:
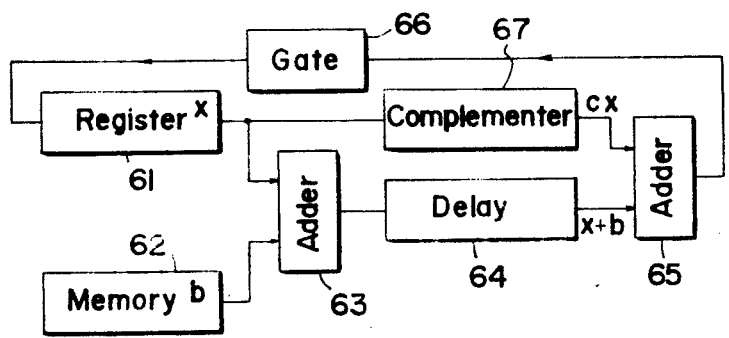
FIG. 6 shows another embodiment of the function generator.

The relation between the altitude, atmospheric pressure and temperature is given by the Laplace's equation:

$$h_m - h_r = 18,400(\log_{10} P_r - \log_{10} P_m) \times (1 + 0.00367\Theta) \quad (1)$$

where suffix $r$ represents the value at the reference altitude and m represents the value at the altitude to be measured, and $h$ : altitude in meters
$P$ : atmospheric pressure in any units
$\Theta$ : mean temperature in °C
$h_r$: altitude of a reference point in meter
$h_m$: altitude to be measured in meter
$P_r$: atmospheric pressure at the reference altitude
$P_m$: atmospheric pressure at the altitude to be measured Although the reference altitude usually is set at sea level, it may be set at any desired reference altitude, such as that of the runway of an airport which an aircraft is approaching.

Applying the formula (1) on a thin layer of atmosphere where the difference of altitude is $\Delta h$, the difference of pressure is $\Delta P$, and temperature is $\Theta$, and using the relation $$\Theta = 15 - 0.0065h \text{ for } h \leqq 11,000 \quad (2)$$

which is adopted by ICAO standard atmosphere, there is obtained:

$$\Delta h = 8,431 (\log_e (P+\Delta P) - \log_e P) (1-2.261 \times 10^{-5} h) \quad (3)$$

On the other hand, a pressure sensor which produces an output signal proportional to the n th power of the pressure sensed and represented by $$V = K P^n \quad (4)$$

is used, and an electrical signal which varies exponentially with respect to a parameter t and represented by $$V = V_o e^{-\frac{t}{T}} \quad (5)$$

is generated.

FIG. 1 shows the graph of the above quantities, where the horizontal axis represents the parameter $t$ and the vertical axis represents the above signal $v$ and sensor output:

$$V_r = KP_r^n, (K: \text{constant}) \quad V_m = KP_m^n \quad 6$$

where $V_r$ is the value of V of the equation (4) at the reference altitude, and $V_m$ is the value of V of the equation (4) at the altitude to be measured and $t_r$ and $t_m$ represent the value of $t$ at which $v$ of the equation (5) is equal to $V_r$ and $V_m$, respectively.

From equations (3), (4), (5), there is derived:

$$\Delta h = \frac{8431}{nT} \Delta t(1-2.261 \times 10^{-5} h) \quad (7)$$

By integrating the above, there results:

$$h_m - h_r = \frac{e^{-2.261 \times 10^{-5} \times \frac{8431}{nT}(t_m - t_r)} - 1}{-2.261 \times 10^{-5}} \quad (8)$$

which means that the barometric altitude according to the ICAO standard atmosphere below 11,000m is obtained by calculating the value $v$ of equation (8) with respect to the parameter $t$ during the interval the value of the signal given by equation (5) exists between the values $V_r$ and $V_m$ of equations (6) derived from the pressure sensor. It is verified that the calculations based on the equation (8) show a close coincidence with the table of standard atmosphere of ICAO. So, it is understood that the numerical values in the equation (8) are in good accordance with those derived from the table of standard atmosphere. It is also understood that the coefficients of equations (21), (26) and (35), discussed hereafter, are also derived from the table of the standard atmosphere. In the example shown by the graph of FIG. 1, $v$ decays with the increase of $t$, but signal $v$ which grows with increase of $t$ also can be used. In such a case, the relation of $t_r$ and $t_m$ are reversed and the present invention can be applied also for such a case. In any case, according to one embodiment of this invention, a function generator representing the equation (8) is correlated with the generation of the signal of equation (5) in that they are generated with respect to a common parameter $t$ and function generation of equation (8) is started at either of the smaller value of $t_r$ or $t_m$ and stopped at the larger one. There are varieties of pressure sensors available for the purpose of producing electrical signals suitable to be used in this invention including those of linear characteristics. But one of the features of this invention is that a pressure sensor of non-linear characteristics, specifically that which renders an electrical signal represented by a power of the pressure sensed, such as a vibrating type having high sensitivity and digital output signal, can also utilized.

FIG. 2 shows an example of a vibrating type pressure sensor. In FIG. 2, 21 shows a case, 22 is a bellows which, together with 21 forms a vacuum tight envelope and the space 23 is evacuated. 24 is a string to be vibrated one end of which is affixed at the bottom of the bellows 22 and the other end is affixed at the tip of an adjusting screw 25, which is adjusted by the nut 26 supported by the arm 27 so that no tension or compression is applied to the string 24 when this sensor is placed in vacuum. The natural transverse vibrating frequency of the string 24 when this sensor is placed in an atmospheric condition is given by $$N = \frac{1}{2l} \cdot \sigma^{1/2} \cdot S^{1/2} \qquad (9)$$

where
  $N$: natural vibrating frequency
  $l$: length of the string
  $\sigma$: linear density of the string
  $S$: tension applied to the string As the tension S is proportional to the atmospheric pressure where this sensor is placed, N is proportional to the ½ th power or square root of the atmospheric pressure sensed. By using this string 24 as a frequency determining element of an oscillating circuit, an electrical signal of frequency N is generated. FIG. 3 shows an example of a measuring circuit using the above oscillator. In FIG. 3, 31 is the above oscillator of frequency N, and 32 is a counter. By counting the output of the oscillator 31 for a predetermined period by the counter 32, there is obtained the digital value of the ½ th power of the atmospheric pressure sensed. When an analog output is needed, a digital to analog converter 33 is used, as shown in FIG. 3.

Next, a function generator of equation (8) is explained. FIG. 4 shows the general principle of the function generation of the equation (8). In FIG. 4, 41 and 43 are registers and 42 is a memory. Suppose the content of the register 41 is $x$ and in the register 43, a number $cx$ which is proportional to the content of the register 41 is stored, and in the memory 42 a constant $b$ is given. The circuit of FIG. 4 is so constructed that the contents of the memory 42 and the register 43 are added to the content of the register 41 in response to a pulse. Then, when $\Delta p$ pulses applied, the corresponding change of $x$ is given by $$\Delta x = b\Delta p + cx\Delta p \qquad 10$$

Integrating the above under initial condition $p=0$, $x=0$;

$$x = (b/c)(e^{cp} - 1) \qquad 11$$

By making $$h_m - h_r = x \qquad 12$$

$$-2.261 \times 10^{-5} \times (8,431/nT)(t_m - t_r) = cp \qquad 13$$

$$-2.261 \times 10^{-5} = c/b, \qquad 14$$

the function of equation (8) is generated.
FIG. 5 shows an embodiment of the function generator. In FIG. 5, a register 51, a memory 52 and a register 53 correspond to elements 41, 42, 43 of FIG. 4, respectively. 54 is a memory which stores c, and 57, 58, 59 are adders. 55 is a circuit which detects the change of the content $x$ of the register 51 when each command pulse is applied and opens gate 56 when and only when the 2° digit of the register 51 is changed. U.S. Pat. No. 3,729,999 shows one example of such detecting circuit in its FIG. 8. When one command pulse is applied, the contents of the register 51, the memory 52, the register 53, the memory 54 are all read out simultaneously and are applied to the corresponding adders except that the memory 54 is applied to the adder 59 only when the gate 56 is opened. As the circuit is so constructed that the increment of $x$ is never 2 or more, that is, the change of the integer portion of $x$ is 0 or 1 at any compound pulse received, the content of the register 53 becomes $cx$ when $p$ command pulses are applied and the content of the register 51 becomes $x$. The outputs of the adders 59 and 58 are applied to the inputs of the adders 58 and 57, respectively, and the outputs of the adders 59 and 57 are rewritten into the registers 53 and 51 respectively so that the circuit of FIG. 5 performs the function generation as explained with FIG. 4. When any of the contents of registers or memories is negative, its complement and sign bit are used and the addition is made algebraically. In the arrangement of FIG. 5, the memory 52 and the adder 58 can be eliminated by presetting the register 53 to $b$, and when the binary logic is used, the value of altitude obtained at the register 51 can be displayed through a binary to decimal converter. This decimal value of the altitude can also be obtained at a decimal counter 50 which counts the output signal from the detector 55.

A specific value can be given to the constant c of equation (13) and (14). Let's discuss such a case where, for example;

$$c = -1 \times 10^{-5} \qquad 15$$

$$b = 0.4423 \qquad 16$$

$$p = 19,062.5 \ (t_m - t_r/nT \qquad 17$$

Under such conditions, which are very practical, the function generation of equation (8) can be simplified. FIG. 6 shows one embodiment of the above function generator. In FIG. 6, a register 61 and a memory 62 correspond to the register 41 and the memory 42 of FIG. 4 respectively, and the circuit is constructed for a decimal system. Contents of the register 61 and the memory 62 are read out from their LSD (Least Significant Digit) and applied to the adder 63, and after passing through a five decimal places delay circuit 64, are applied to one of the inputs of adder 65. To the other input of the adder 65, the read out number of the register 61 is applied through a complementer 67. So, when the output of the delay circuit 64 represents $x+b$, the output of the complementer 67 represents $cx$ and the output of the adder 65 represents $x+b+cx$ which is rewritten into the register 61 after the unnecessary insignificant digits are inhibited by a gate 66. By repeating the above operation, $x$ of equation (11) is obtained in the register 61.

The above explanation is given on the basis of serial logic, but it is obvious that the same principle can be applied in the cause of a parallel logic circuit by shifting the digits of the inputs of parallel adders in place of delaying the digits.

Figure 7:
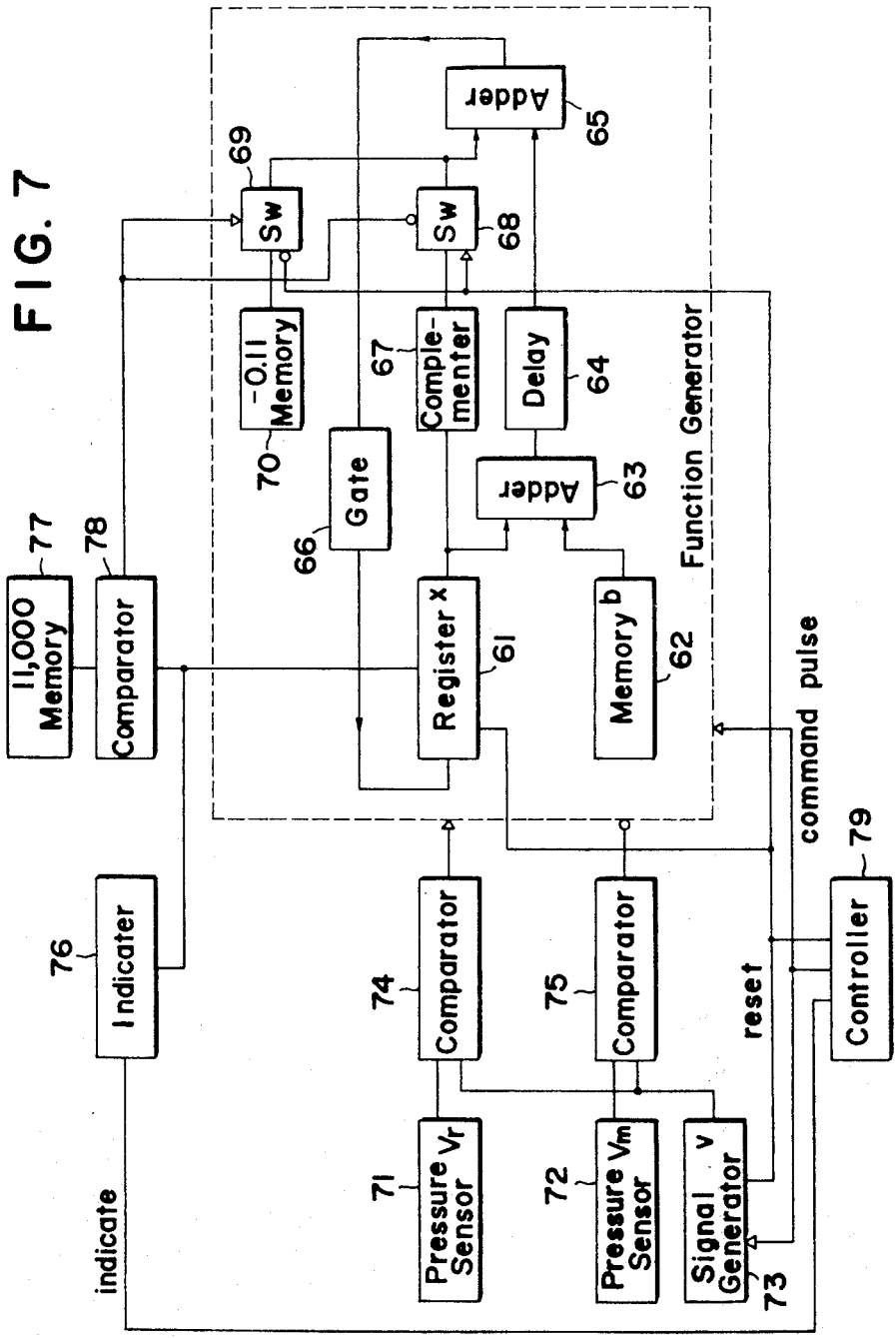
FIG. 7 shows an embodiment of the barometric altimeter according to this invention, utilizing the function generator of FIG. 6.

FIG. 7 shows one embodiment of the barometric altimeter according to this invention, utilizing the function generator of the type of FIG. 6. In FIG. 7, the register 61 through the complementer 67 correspond to those of FIG. 6 and constitute a function generator in accordance with equation 8, 71 and 72 represent the output of the sensor described before corresponding to the reference altitude and the altitude to be measured, 73 is the signal generator of equation (5), 74 and 75 are comparators, and 79 is a controller. Command pulses from the controller 79 are used as a common parameter for both of the function generator shown in the dotted enclosure and the signal generator 73. At $t=t_r$, $v$ becomes equal to $V_r$ and comparator 74's output pulse initiate the function generation, and at $t=t_m$, $v$ becomes equal to $V_m$ and comparator 75's output pulse terminate the function generation to give the altitude at the register 6, which is displayed at the indicator 76 by a command from the controller 79. Before the next measuring cycle the register 61 and signal generator 73 and, if necessary, switches 68 and 69 (which are explained later) are reset to their initial conditions. To measure the altitude above 11,000m where the temperature is constant up to 20,000m, a memory 77 which stores 11,000 is furnished. This memory content is compared by a comparator 78 with the content of the register 61 and when the coincidence is detected, the comparator 78 sends out a signal to turn off the switch 68 and turn on the switch 69 and the value −0.1100 stored in the memory 70 which corresponds to $cx$ at 11,000m is applied to the input of the adder 65 in place of the output of the complementer 67. Thus this arrangement can measure the altitude up to 20,000m according ICAO standard atmosphere. Instead of using the memory 70, the same result is obtained by changing the content of the memory 62 to 0.3323 and by turning off the switch 68 at 11,000m. It is possible to eliminate one of the comparator 74 or 75 by selecting the initial value of the signal generator 73 to the output $V_r$ of the pressure sensor 71 or $V_m$ of the pressure sensor 72 and by using the starting signal to generate the signal $v$ of the signal generator 73 for the purpose of initiating the generation of function. This is specially convenient when the reference altitude is set at the level of a airport, where an aircraft is going to land and $V_r$ is given as a digital value which can be set by, for example, thumb wheels or data transmission from the ground to obtain a precise height from the runway when approaching.

Figure 8:
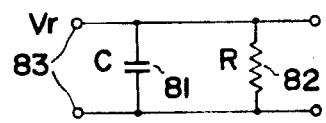
FIG. 8 shows an analog method to generate the exponential signal $v$ of equation (5) for this invention.

Various methods can be used to generate the signal $v$ of the equation (5). FIG. 8 shows an analog method. In this case, time is the parameter. A capacitor 81 is charged with voltage $V_r$ and discharged through a resistor 82 at $t=0$ and by selecting capacity C and resistance R to satisfy:

$$CR = T \qquad 18$$

the signal of equation (5) with initial value of $V_r$ is obtained. The terminal voltage of a capacitor being charged by a fixed voltage through a resistor is also available for this purpose, in this case, $v$ increases with time and the relation of $t_r$ and $t_m$ is reversed.

Figure 9:
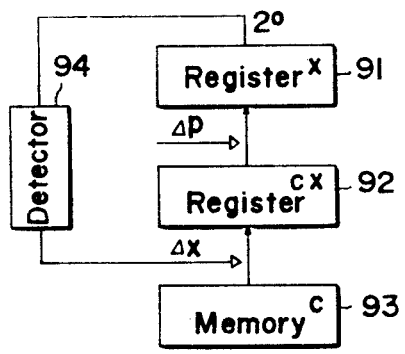
FIG. 9 shows an embodiment of the invention providing a digital method of generating the above signal $v$.

A digital method of generating the signal $v$ of the equation (5) available. FIG. 9 shows an embodiment of digital generation of signal $v$. In FIG. 9, 91 is the first register and 92 is the second register and 93 is a memory and 94 is a detecting circuit similar to the detector 55 of FIG. 5. In response to each command pulse (parameter), the content of the register 92 is added to the register 91, and in response to the signal from the detector 94, the content of the memory 93 is added to the register 92. By giving the memory 93 a constant c, and by giving the registers 91 and 92 respective initial values and by repetitively executing the above operation, a digital value $X = V_0 e^{cP}$, where $V_0$ is the initial value given to the register 91 and P is the number of above operations, is obtained in the register 91, and by substituting X, c and P with $v$, $-1/T$, and t respectively, a signal indicative of equation (5) is obtained at the register 91 digitally. Although the above description is made based on the signal from the pressure sensor as represented by equations (6), it is obvious that this invention can be implemented when the sensor output is given, instead of equation (6). the form:

$$V_r' = a + bV_r, \ V_m' = bV_m \qquad 19 \text{ a} +$$

by changing the signal of equation (5) to $$v' = a + bv \qquad 20$$

It is also obvious that although the example of this specification uses metric system, other unit systems, such as feet, can be used for the implementation of this invention.

Next, another type of function generator which can be incorporated in this invention is explained. The function of equation (8) can be expanded in terms of ascending powers of $(t_m-t_r)$.

Taking up to 4 th power, there is derived:

$$h_m - h_r = 8431 \left[ \frac{t_m-t_r}{nT} - 0.09531 \left( \frac{t_m-t_r}{nT} \right)^2 + 0.006054 \left( \frac{t_m-t_r}{nT} \right)^3 - 0.0002885 \left( \frac{t_m-t_r}{nT} \right)^4 \right] \qquad (21)$$

This formula, although approximation, is very accurate and shows error of only 1m at altitude of 8675m which corresponds to the value $(t_m-t_r)/nT = 1$.

Figure 10:
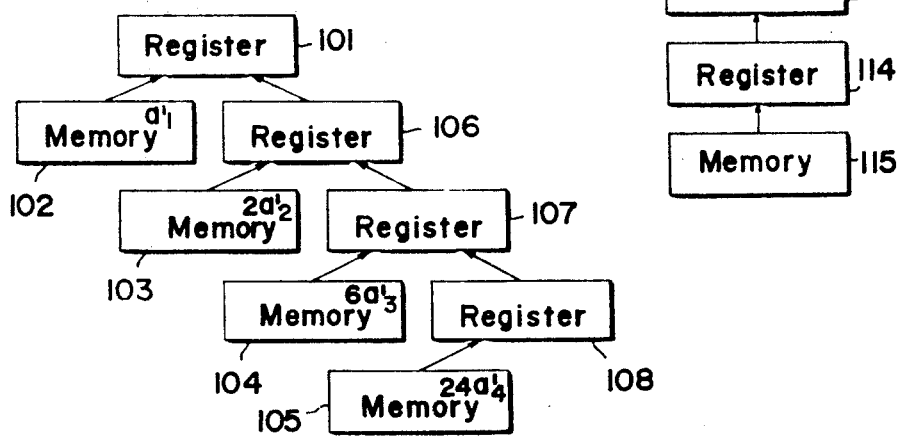
FIG. 10 shows a cascade accumulation circuit to be utilized in this invention

FIG. 10 shows a cascade accumulation circuit to obtain the value expressed by equation (21). In FIG. 10; 101, 106, 107 and 108 are registers and 102, 103, 104 and 105 are memories. In response to a pulse, the contents of memories 102, 103, 104 and 105 are added respectively to the contents of the registers 101, 106, 107 and 108, and the content of the register 108 is added to the register 107, the content of the register 107 is added to the register 106 and the content of the register 106 is added to the register 101. A feature of this circuit is that, for example, the content of the memory 103 is added to the register 106 and the content of the register 106 is in turn added to the register 101; namely, the content of the memory 103 is cascadely accumulated through the register 106 to the register 101 corresponding to each pulse. By putting in the memories 102, 103, 104 and 105, the following values respectively:

$$a_1' = a_1 - a_2 + a_3 - a_4 \qquad 22$$

$$2a_2' = 2a_2 - 6a_3 + 14a_4 \qquad 23$$

$$6a_3' = 6a_3 - 36a_4 \qquad 24$$

$$24a_4' = 24a_4 \qquad 25$$

and repeating the above operation $p$ times corresponding $p$ pulses, and putting $a_0$ at the register 101 initially, there is derived in register 101 the following value:

$$x = a_0 + a_1 p + a_2 p^2 + a_3 p^3 + a_4 p^4 \qquad 26$$

Figure 11:
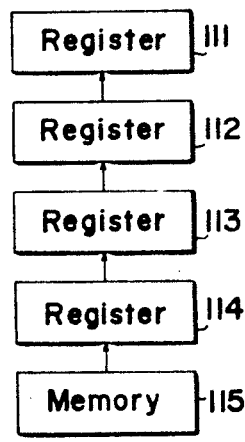
FIG. 11 shows a reduced i.e., simplified arrangement of the cascade accumulation circuit of FIG. 10.

By properly choosing the values of coefficients $a_0$, $a_1$, $a_2$, $a_3$ and $a_4$ so that $p$ of equation (26) represents $(t_m-t_r)/nT$ of equation (21), a value of $x$ is obtained which represents $h_m-h_r$ of equation (21) in the register 101. Thus the circuit of FIG. 10 can be used as a function generator of this invention. It is also understood that a similar circuit can also be used to generate digitally the signal of equation (5). The circuit of FIG. 10 can be reduced to that of FIG. 11 by placing initially the contents of the memories 102, 103, 104 at the registers 106, 107, 108 respectively. In FIG. 11, a register 111 and a memory 115 correspond to the register 101 and the memory 105 of FIG. 10 respectively and registers 112, 113, 114 represent the registers 106, 107, 108 of FIG. 10, in which the contents of memories 102, 103 and 104 are initially placed, respectively. An efficient circuitry which performs above explained cascade accumulations in serial logic is shown in the U.S. Pat. application Ser. No. 248,141 now U.S. Pat. No. 3,843,872, and is available for this invention. Although the cascade accumulator of FIG. 11 consists of four registers 111 through 114 and one memory 115, these registers and the memory may be all substituted by memories, because a register is a type of memory. So, it may be said that the cascade accumulator of FIG. 11 is composed of five memories represented by numerals 111 through 115. That is, to generate a polynomial function of fourth degree of P as expressed by the equation (26), five memories are needed. Further, it is apparent, in general, that for the purpose of this invention, to generate a $m^{th}$ (where $m$ is an integer and $m \geq 2$) degree polynomial equation of the form of equation (26), $m+1$ memories designated by addresses $0, 1, 2, \ldots, m$ are needed. Then, the above explained cascade accumulation to generate an $m^{th}$ degree polynomial of P is to perform the additions of the contents of the memories of addresses of $m, m-1, \ldots, 1$ to the contents of memories of addresses $m-1, m-2, \ldots, 0$, respectively, a number of times corresponding to the value of P of the equation (26).

Figure 12:
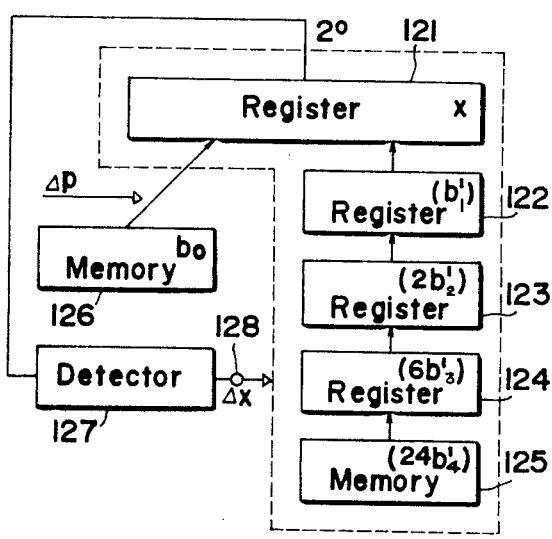
FIG. 12 shows another type of cascade accumulator.
Figure 13:
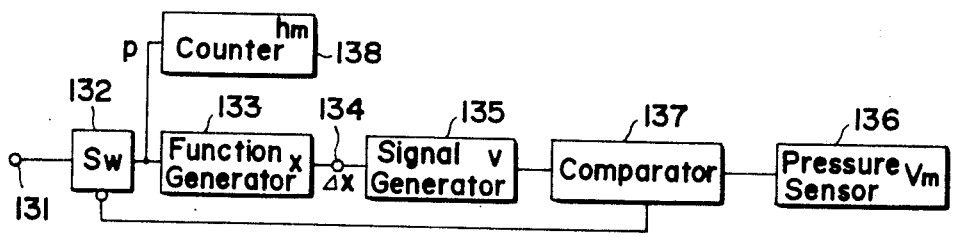
FIG. 13 shows another embodiment of this invention utilizing the cascade accumulator of FIG. 12.

Next, another embodiment of this invention is shown by FIG. 13, where another type of cascade accumulator shown in FIG. 12 is incorporated. In FIG. 12, registers 121, 122, 123, 124 and a memory 125 correspond to the registers 111, 112, 113, 114 and the memory 115 of FIG. 11, respectively. The elements inside the dotted enclosure from a cascade accumulator equivalent to FIG. 11. Besides, there are one memory 126 and one detector circuit 127 which is similar to the detector 55 of FIG. 5 and operates to detect the increment of the content of the register 121 at each command pulse received, to produce secondary command pulses equal in number to the increment of the content of the register 121 and to actuate the cascade accumulator (in the dotted enclosure) to execute the cascade accumulation a number of times which correspond to the secondary command pulses. By putting $b_0$ in the memory 126, by adding $b_0$ to the register 121 corresponding to each primary command pulse, by putting $b_1'$ $2b_2'$ and $6b_3'$ initially in the registers 122, 123 and 124, respectively, by storing $24b_4'$ in the memory 125, by making $$b_1' = b_1 - b_2 + b_3 - b_4 \qquad 27$$

$$2b_2' = 2b_2 - 6b_3 + 14b_4 \qquad 28$$

$$6b_3' = 6b_3 - 36b_4 \qquad 29$$

$$24b_4' = 24b_4 \qquad 30$$

$$(b_1 - 1/-b_0) = a_1 \qquad 31$$

$$-b_2/b_0 = a_2 \qquad 32$$

$$-b_3/b_0 = a_3 \qquad 33$$

$$-b_4/b_0 = a_4 \qquad 34$$

and by applying p primary command pulses, the register 121 derives the value x, expressed by:

$$p = a_1x + a_2x^2 + a_3x^3 + a_4x^4 \qquad 35$$

The right side of the equation (35) is a power series of $x$. Since $x$ is a function of $p$, equation (35) shows that the power series of the function $x$ is equal to the number of command pulses $p$.

One feature of the function generator of FIG. 12 is that the secondary command pulses appearing at the output terminal 128 of the detector circuit 127 represent the increment of $x$ at each primary command pulse received. So that, the total number of secondary command pulses at the terminal 128 is equal to $x$. The equation (35) can represent the equation (21) which is an expanded form of equation (8) where $x$ represents the parameter $tm/T$ and $p$ represents the altitude $h_m$. (Hereafter $t_r$ and $h_r$ are assumed to be zero.)

FIG. 12 shows a cascade accumulator to generate the value X given by the equation (35). In this example X is the root of a fourth degree polynomial equation when P is given. It is obvious, as explained with respect to the accumulator of FIG. 11, that when the polynomial is of the "$m^{th}$" degree (where $m$ is an integer and $m \geq 2$), there are required $m+1$ memories in the dotted enclosure of FIG. 12. These memories may be designated by addresses $0, 1, 2, \ldots, m$, and the memory 126 is designated by address $d$. Then the operation of the cascade accumulator for an "$m^{th}$" polynomial expression is expressed by: the memories designated by addresses $0, 1, 2, \ldots, m$, each loaded with a respective, initial value, and a memory designated by address $d$ storing a constant value, and in response to each of the primary pulses the content of the memory of address $d$ is added to the content of the memory of address 0, and the detector detects the increment of the content of the memory of address 0 each time a primary command pulse is received and produces secondary command pulses equal in number to the increment detected, and in response to each secondary command pulse produced, the contents of the memories of addresses $m, m-1, \ldots, 1$ are added to the contents of the memories of addresses $m-1, m-2, \ldots, 0$, respectively.

FIG. 13 shows an embodiment of this invention utilizing the cascade accumulator of FIG. 12 as a function generator. In FIG. 13, primary command pulses are applied at the terminal 131, 132 is a switch, 133 is the function generator of FIG. 12, the terminal 134 corresponds to the terminal 128 of FIG. 12, 135 is and 135 signal generator of $v = V_r e^{116\ x}$, where $x = t/T$, equivalent to the equation (5) which starts from $v = V_r$ as its initial value corresponding to $t_4 = 0$. The signal generator 135 is achieved, or implemented, by the circuit discussed with respect to the FIG. 9 wherein the terms X, $V_0$, c and P of FIG. 9 are replaced by v, $V_r$, $-1$, and X, respectively. 136 shows the sensor output $V_m$ which is compared by a comparator 137 with the value v of the signal generator 135. When $v$ becomes equal to $V_m$, $x$ represents $tm/T$ and by equation (35), the number of primary command pulses p represents the altitude to be measured. So, by turning off the switch 132 by the coincidence pulse from comparator 137, the number of primary pulses which represent the altitude is obtained and can be counted by the counter 138 to indicate the altitude. In this embodiment the function generator 133 and the signal generator 135 are so correlated that the operation of the signal generator is controlled by the increment signal from the function generator.

In the configuration of FIG. 13, the primary command pulses are applied through the terminal 131 and switch 132 to the function generator 133 which produces secondary command pulses. These secondary command pulses are applied through terminal 134 as command pulses for the signal generator 135, and within the signal generator 135, "secondary command pulses in the signal generator 135" are produced. These pulses are regarded as tertiary command pulses of the system represented by FIG. 13.

Next, another embodiment of this invention is explained. Assuming $t_r = 0$, $h_r = 0$, the equation (8) can be expressed by:

$$\frac{t_m}{T} = \frac{n\log(1-2.261\times10^{-5}h_m)}{-2.261\times10^{-5}\times 8431} \qquad (36)$$

Figure 14:
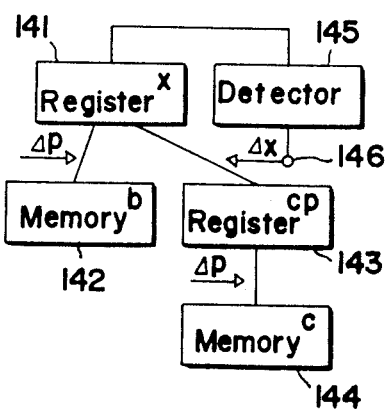
FIG. 14 shows a function generator to represent the equation (36) utilized in another embodiment of this invention.

FIG. 14 shows a function generator to represent the equation (36), where 141 and 143 are first and second registers, respectively 142 and 144 are first and second memories and store $b$ and $c$, respectively, and 145 is a same circuit as the detector circuit 55 of FIG. 5. In this arrangement the contents of the memories 142 and 144 are added to the registers 141 and 143 respectively, in response to a primary command pulse, and the content of the register 143 and is added to the register 141 in response to the secondary command pulse generated by the circuit 145. When $p$ primary command pulses are received, the content of the register 143 becomes $cp$. And when $\Delta p$ more primary command pulses are applied, the increment $\Delta x$ of the content $x$ of register 141 is given by:

$$\Delta x = b\Delta p + cp\Delta x \qquad 37$$

Integrating $\Delta x$, there is derived:

$$x = -(b/c) \log(1-cp) \qquad 38$$

which, for example, by making $$x = 10,000 \, t_m/T \qquad 39$$
$$b = (10,000/8431) \, n = 1.186n \qquad 40$$
$$c = 2.261\times10^{-5} \qquad 41$$
$$p = h_m \qquad 42$$

represents the equation (36).

varies right side of equation (39) is a logarithmic function of a variable $(1-cp)$, and, since $c$ is a constant, $(1-cp)$ is a variable which varies linearly with the number of command pulses $p$.

Figure 15:
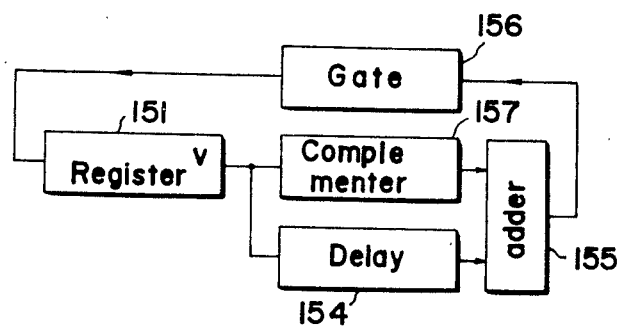
FIG. 15 shows an example of a circuit to generate the exponential signal $v$ of the equation (5) to be used in this invention.

FIG. 15 shows an example of a circuit to generate the signal of equation (5) when T is selected, for example, corresponding to equation (39), to be 10,000. This circuit is similar to that of FIG. 6 in its operation and a register 151, a delay circuit 154, an adder 155, a gate 156, and a complementer 157 correspond to 61, 64, 65, 66 and 67 respectively, and the memory 62 and the adder 63 are eliminated. As T is selected to be 10,000, the delay circuit 154 gives 4 decimal delays to the signal passing through it. By giving the register 151 the initial value $V_r$ and by performing the operation $t$ times, there is derived the digital signal:

$$v = V_r \, e^{-0.0001t} \qquad 43$$

at the register 151.

FIG. 16 shows an embodiment according to this invention utilizing the function generator of FIG. 14 and the signal generator of FIG. 15 provided, however, the right side of the equation (43) is expressed by $V_r e^{-0.001x}$. Although the type of function generator is different, the configuration and operation of FIG. 16 is same as those of FIG. 13. A terminal 161 through a counter 168 corresponds to elements 131 through 138 of FIG. 13, respectively, and does not need further explanation; there is added, however, a digital to analog converter 169 to show when $V_m$ is obtained in analog form to be compared by an analog comparator 167.

Next, another embodiment of this invention is described. Integrating the equation (3) under the condition $h_r = 0$, there is derived:

$$P_m = P_r e^{\frac{1}{2.261\times10^{-5}\times 8431}\log_e(1-2.261\times10^{-5}\cdot h_m)} \qquad (44)$$

By raising this expression to the $n$ th power, there is obtained:

$$BP_m{}^n = BP_r{}^n e^{\frac{n}{2.261\times10^{-5}\times 8431}\log_e(1-2.261\times10^{-5}h_m)} \qquad (45)$$

So, by generating an electrical time signal represented by;

$$v = V_r e^{\frac{n}{2.261\times10^{-5}\times 8431}\log_e(1-2.261\times10^{-5}\frac{t}{T})} \qquad (46)$$

where $V_r$ is given by the equation (6) and by measuring the time $t_m$ when $v$ becomes equal to $V_m$, where $V_m$ is the sensor output at the altitude to be measured as represented by the equation (6) there is obtained the altitude by $$h_m = t_m/T \qquad 47$$

which shows that the altitude to be measured is obtained by counting a predetermined frequency of $1/T$ during a period of time $t_m$.

FIG. 17 shows the principle of this measurement, in which the horizontal axis indicates time, the vertical axis the sensor outputs, and the signal $v$ is expressed by the equation (46) which starts from $V_r$ as its initial value. The time $t_m$ at which the curve $v$ intersects the horizontal line of $V_m$ shows the altitude.

FIG. 18 is the block diagram of this measurement, in which 183 represents the sensor output $V_m$, 182 represents the signal generator of equation (46), and 184 is a compartor. A controller 181 initiates the operation of the signal generator 182 and the counter 185. This counting is stopped when $v$ becomes equal to $V_m$ by means of the coincident pulse from the comparator 184. Thus, the counter 185 indicates the altitude $h_m$. A feature of this embodiment is that the signal $v$ is not exactly a exponential function but instead is a quasi-exponential function having a non-linear exponent with respect to time. The instantaneous time constant of the quasi-exponential signal of equation (46) varies linearly with time, namely by differentiating the exponent, there is derived:

$$\frac{d}{dt}\log(1-2.261\times10^{-5}\ \frac{t}{T}) = \frac{-2.261\times10^{-5}}{T-2.261\times10^{-5}t}, \quad (48)$$

which shows that the instantaneous time constant changes linearly with time. The function generator used in this embodiment is a counter, which generates a linear function with respect to time and indicates the altitude measured.

FIG. 19 shows the principle for generating the quasi-exponential signal $v$ of equation (46). Capacitor C is charged with voltage $V_r$, which is represented by the equation (6), and at $t=0$, discharged through resistor R, the resistance of which is varied with time according to:

$$R = R_0(1-\alpha t) \quad 49$$

where $t$ is the time, $R_0$ is the initial value of the resistance R at $t=0$, and $\alpha$ is a constant. Then the voltage across the capacitor C is given by:

$$v = V_r e^{\frac{1}{\alpha R_0 C}\log(1-\alpha t)} \quad (50)$$

By making $\alpha = 2.261 \times 10^{-5}/T$ and $R_0C = 8431\ T/n$ in equation (50) it is understood that the quasi-exponential signal v of equation (46) can be generated by the circuit of FIG. 19.

FIG. 20 shows a practical example to implement the principle of FIG. 19. The capacitor C is charged through terminal 201 to an initial value $V_r$, and at $t=0$, terminal 201 is disconnected from voltage source and switch $S_0$ is closed. As the time goes on, the switches $S_1$, $S_2$, ... are successively closed as the discharging resistances follow the equation (49). Although FIG. 20 shows one side of each switch S; and the terminal of the capacitor C grounded, a circuit isolated from ground can be used as a general case. In such case the terminal of the capacitor C which is connected to the terminal 201 may be called a high potential terminal and the other terminal may be called a low potential terminal, irrespective of the voltage applied to the capacitor. The circuit composed of resistors $R_1$ through $R_6$ and switches $S_0$ through $S_5$ has two terminals, one connected to the terminal 201 and the other represented by the ground in FIG. 20. Thus, this circuit constitutes a two terminal network containing resistors and switches, and the value of the resistance between two terminals is infinite before switch $S_0$ is closed and, at the instant of start of a measurement the value of the resistance is $R_0$ which is the sum of the resistances $R_1$ through $R_6$ and is a predetermined value, and decreases linearly with time as expressed by the equation (49) by the switches $S_1$ through $S_5$ closing successively. This circuit can be used as the signal generator 182 of FIG. 18, and, as the counter 185 counts linearly with time, the control of switches $S_0$, $S_1$, $S_2$, ... can be performed by the decoded signal of the content of the counter 185. A cascade accumulation circuit of the type represented by the FIG. 10 or FIG. 11 can also be used to generate the signal $v$ of equation (46). Although this is an approximation, the accuracy is very high and can be used to implement this invention. Further in this case, the signal $v$ can be generated digitally.

Another example of producing the signal $v$ of equation (46) is shown below. If a resistance $r$ is made conductive only for a time interval $\tau$ during each of the repeated periods of $\tau_0$, the effective conductance is given by;

$$(1/r) \cdot (\tau/\tau_0) \quad 51$$

Hence, by setting the time interval $\tau$ to satisfy:

$$\frac{\tau}{\tau_0} = \frac{r}{R_0} \cdot \frac{1}{1-\alpha t} \quad (52)$$

where $t$, $R_0$ and $\alpha$ are same as those of equation (49), an equivalent resistance to be used as R of FIG. 19 is realized. This control of time modulation of resistance is attained by means of the circuit of FIG. 14, where in the memory 144, $\beta$ is stored in place of $c$. Then, the value obtained at the register 141 is given by $$x = -(b/\beta)\log(1-\beta p) \quad 53$$

Suppose the frequency of primary command pulse is $f$ Hz, then $$p = ft \quad 54$$

and the number of secondary command pulses $\Delta x$ during the period of time $\Delta t$ is given by $$\Delta x = b\ \frac{f\Delta t}{1-\beta ft} \quad (55)$$

or $$\frac{\frac{\Delta x}{2f}}{\Delta t} = \frac{b}{2} \cdot \frac{1-1}{1-\beta ft} \quad (56)$$

As $\frac{1}{2}f$ represents the half cycle time of the primary command pulse, by setting $\Delta t = \tau_0$, $\beta f = \alpha$ and $b = 2r/R_0$, equation (56) shows that the time interval $\tau$ of equation (52) is realized by $\Delta x$ times of half cycle time of primary command pulse which is equal to the sum of the half cycle time of secondary command pulses of FIG. 14. So that it is clear that the circuit shown by FIG. 14 can be used to control the switching of the resistor R of FIG. 19 to generate the signal $v$ of equation (46).

FIGS. 21A and B show the exemplary timing of the above control signal during the time period $\tau_0$ where the waveform of FIG. 21A represents the primary command pulses and the waveform of FIG. 21B represents the secondary command pulses $\Delta x$ in number, which cause the current pulses through the resistance $r$, and the summation of the shaded portion of time of FIG. 21B represents the time interval $\tau$. For the preferred embodiment of this invention the width of the primary command pulse is chosen to be half of the period $1/F$ and equal to the width of the secondary command pulse.

Figure 22:
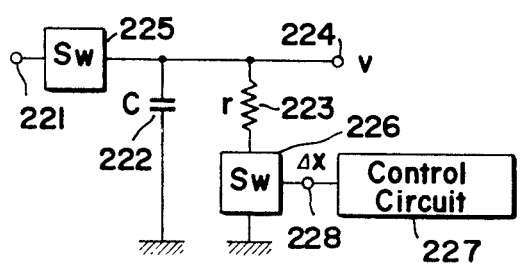
FIG. 22 shows an another arrangement to generate the quasi-exponential signal v of the equation (46)

FIG. 22 shows an arrangement of the above-described signal generator in which 221 is the terminal where $V_r$ of equation (6) is applied and this is disconnected by a switch 225 at $t=0$, and 222 is the capacitor C of FIG. 19. A switch 226 is controlled to be conductive only when at the terminal 228 of the circuit 227, (which is the same circuit as FIG. 14 and is operated by primary command pulses of frequency $f$ Hz.), a secondary command pulse appears. Thus the equivalent resistance $r$ of resistor 223 changes according to the equation (49), and produces the signal $v$ of equation (46) at the terminal 224.

Figure 23A:
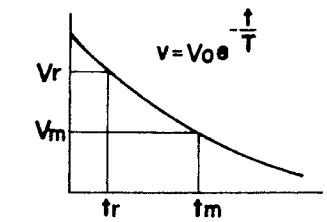
FIGS. 23A and B, and 24 shows the principle of another embodiment of this invention.
Figure 23B:
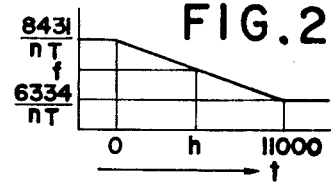

FIGS. 23A and B show the principle of another embodiment of this invention. In the above explained embodiment, a quasi-exponential signal which has an instantaneous time constant varying linearly with time is generated and a constant frequency is counted by a counter to indicate the altitude. Instead of the above, the same result is obtained by using a signal V of exponential function to determine the times $t_r$ and $t_m$ as shown by FIG. 23A, and by changing the counting frequency of a counter which varies linearly with time as shown by FIG. 23B. When the content of the counter is 0, the counting frequency should be $8431/nT$; when the content of the counter is 11,000, the counting frequency should be $6334/nT$; and in between when the content of the counter is h, the counting frequency should be:

$$f = (1/nT) [8431 - (8431-6334)(h/11000)] \qquad (57)$$

Figure 24:
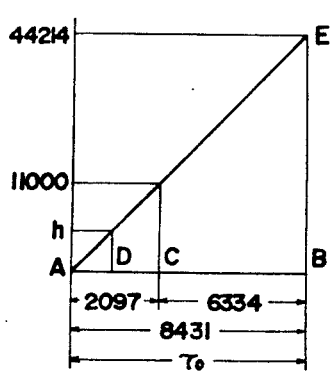

FIG. 24 shows the principle to produce an average frequency $f$ of equation (57) during a short time interval $\tau_0$. The saw tooth AEB in FIG. 24 has a height proportional to 44,214 and width proportional to 8431. Then the point C, which corresponds to a height of 11,000, divides AB in proportion to 2097:6334. A point D corresponding to any height $h$ below 11,000 divides AB in some proportion, and length DB is proportional to $f$ of equation (57).

Figure 25:
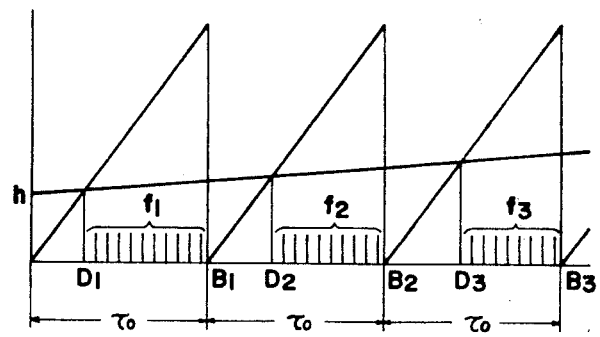
FIG. 25 shows a timing chart of the embodiment of this invention according to the principle shown by FIGS. 23A and B, and 24.

FIG. 25 shows the timing of this embodiment. The horizontal time axis is divided into short time intervals of $\tau_0$, and in each time interval a saw tooth wave is generated, and points $D_1$, $D_2$, . . . are determined by the intersection of saw teeth and the line of height h derived from the instantaneous contents of the counter. If the frequency $8431/nT$ is counted by a counter only for the interval of $D_1 B_1$, $D_2 B_2$, . . . , the average frequency counted is expressed by the equation (57).

Figure 26:
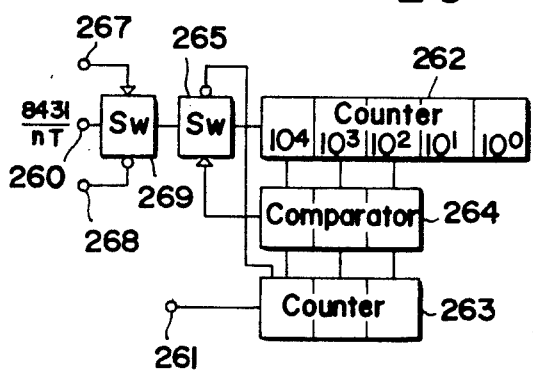
FIG. 26 shows the circuit arrangement of the embodiment of this invention according to the principle shown by FIGS. 23A and B, and 24.

FIG. 26 shows the circuit arrangement of this embodiment. A terminal 260 receives frequency of $8431/nT$, terminal 267 receives a pulse at time $t_r$ to turn the first switch 269 on and terminal 268 receives a pulse at time $t_m$ to turn switch 269 off. 262 is the first counter to indicate altitude and 263 is an auxilliary second counter, which preferably counts higher frequencies than those of the signals applied through terminal 260 to counter 262, and is reset when having counted a number, for example, 442 which corresponds to the height of the saw teeth of FIG. 25. So, the counter 263 generates the saw teeth of FIG. 25. The content of the counter 262 is compared with that of the counter 263 and when the outputs become equal, i.e. at the points $D_1$, $D_2$ . . . of FIG. 25, the comparator 264 generates first control signals to turn the second switch 265 on and when counter 263 is reset, it generates second control signals by which the switch 265 is turned off. Thus the average frequency in a short time interval counted by the counter 262 is represented by the frequency $f$ of equation (57) and indicates the altitude. In this case, as shown in FIG. 26, the comparator 264 is not required to compare all the digits of the counters, that is, only a suitable number of most significant digits are compared, which simplifies the circuits. To measure above 11,000m, the content of the counter 262 is monitored by a conventional method and when it has reached 11,000 the average counting frequency is changed over to $6334/nT$. In this embodiment, the function generator is a counter, which counts non-linearly with time as is represented by equation (8), and time is the parameter.

Another embodiment of this invention is described below. Applying the equation (1) to a column of atmosphere from $h_r$ to $h_m$ and substituting $\Theta$ with an average temperature of the air column derived from equation (2), the altitude below 11,000M is represented by:

$$h_m = 18400 \log_{10} \frac{P_r}{P_m} \times (1.055 - 1.1927 \times 10^{-5} h_m); \qquad (58)$$

by using natural logarithm, $$h_m = \frac{8396 \log_e \frac{P_r}{P_m}}{1 + 0.09531 \log_e \frac{P_r}{P_m}} \qquad (59)$$

By the procedure explained in FIG. 1, the value $\log_e(P_r/P_m)$ is expressed in terms of $(t_m - t_r)$ to obtain $$h_m = \frac{8396 \frac{1}{nT}(t_m - t_r)}{1 + 0.09531 \frac{1}{nT}(t_m - t_r)} \qquad (60)$$

Figure 27:
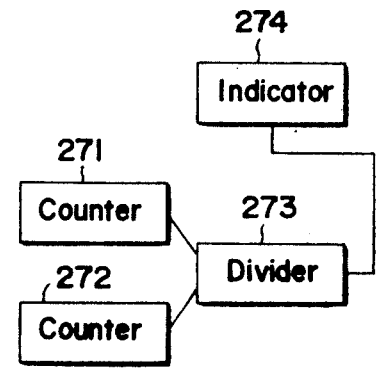
FIG. 27 shows a block diagram of another embodiment of this invention.

FIG. 27 shows a block diagram to obtain the altitude $h_m$ according to equation (60). In FIG. 27, counter 271 counts the frequency proportional to 8396 for a time interval $(1/nT)(t_m - t_r)$, counter 272 is preset to a number proportional to 1 and counts frequency proportional to 0.09531 for a time interval $(1/nT)(t_m - t_r)$. The contents of both counters are read out and divided by the divider 273 to derive the altitude of equation (60) in an indicator 274. This process applies the Laplace's formula for a large height of an air column and hence, causes some error but is still usable for limited applications.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A barometric altimeter comprising:
   means for generating an electrical signal $V_r$ representing the atmospheric pressure at a reference altitude,
   means including a pressure sensor for generating an electrical signal $V_m$ responsive to the atmospheric pressure at the altitude to be measured,
   means for generating an electrical signal $v$ varying exponentially with time,
   means comparing said electrical signal $v$ for coincidence with said electrical signals $V_r$ and $V_m$ for generating electrical pulses at the respective times of coincidence, $t_r$ and $t_m$,
   a function generator containing a shift register loaded with a predetermined initial value, a memory storing a constant value and being non-destructively readable, a delay circuit, a complementer, first and second adders and a command pulse generator producing command pulses of a frequency determined in relation to the known characteristics of the pressure sensor, the output of said shift register being connected to one of the inputs of said first adder and also to the input of said complementer, and the output of said memory being connected to the other input of said first adder, and the output of said first adder being connected to the input of said delay circuit, and the output of said complementer being connected to one of the inputs of said second adder, and the output of said delay circuit being connected to the other input of said second adder, and the output of said second adder being connected to the input of said shift register, said function generator including means for reading out said shift register and said memory simultaneously in response to each of said command pulses in operation of said function generator, means to control the operation of said function generator to initiate operation thereof in response to the earlier generated one of said electrical pulses generated at the times $t_r$ and $t_m$ and to terminate the operation thereof in response to the later generated one of said electrical pulses generated at the times $t_r$ and $t_m$, and said register, at termination of operation of said function generator, storing therein a value representative of the altitude to be measured.

2. A barometric altimeter comprising:

means for generating an electrical signal $V_r$ representing the atmospheric pressure at a reference altitude, means including a pressure sensor for generating an electrical signal $V_m$ responsive to the atmospheric pressure at the altitude to be measured, means for generating an electrical signal $v$ varying exponentially with time, means comparing said electrical signal $v$ for coincidence with said electrical signals $V_r$ and $V_m$ and for generating electrical pulses at the respective times of coincidence, $t_r$ and $t_m$, a counting device containing first and second counter means, a comparator and first and second series-connected switches, and means for supplying a signal of predetermined frequency related to the known characteristics of the pressure sensor to said first and second series-connected switches and therethrough to said first counter means to be counted thereby, and said second counter means counting at a frequency not lower than the frequency of counting by said first counter means, and said comparator comparing a predetermined number of the most significant digits of the contents of said first and second counter means and producing first control signals when said predetermined most significant digits of said second counter means exceed said predetermined most significant digits of said first counter means, means to produce second control signals and also to reset said second counter means when the count of said second counter means reaches a predetermined value, and means to turn said second switch on in response to each of said first control signals and to turn said second switch off in response to each of said second control signals, and means to turn said first switch on in response to said electrical pulse generated at the earlier of the times $t_r$ and $t_m$, and means to turn said first switch off in response to said electrical pulse generated at the later of the times $t_r$ and $t_m$, and said first counter means of said counting device providing in accordance with the count thereof, the value representative of the altitude to be measured.

3. A barometric altimeter comprising:

means for generating an electrical signal $V_r$, representing the atmospheric pressure at a reference altitude, means including a pressure sensor for generating an electrical signal $V_m$ responsive to the atmospheric pressure at the altitude to be measured, means for supplying primary command pulses, a switch connected to said supplying means, means for turning said switch on to initiate measurement of altitude, said switch, when on, passing said primary command pulses therethrough, a function generator receiving said primary command pulses passed through said switch, and in response thereto generating a function $x$, the value of the power series thereof being expressed by the number of said primary command pulses $p$ received through said switch and applied to said function generator, said function generator containing $m + 1$ memories designated by addresses $0, 1, 2, \ldots, m$, where $m$ is an integer and $m \geq 2$, each loaded with a predetermined intitial value, and another memory designated by address d storing a predetermined value related to the known characteristics of the pressure sensor, and a detector which detects the increment of the content of said memory of address 0 at each time a primary command pulse is applied to said function generator and produces secondary command pulses corresponding in number to said increment of the content of said memory of address 0, said function generator being operative in response to each of said primary command pulses passed through said switch and applied thereto, to add the content of said memory of address d to the content of said memory of address 0, and, in response to each of said secondary command pulses produced by said detector, to add the contents of said memories of addresses $m, m-1, \ldots, 2, 1$ to the contents of said memories of addresses $m-1, m-2, \ldots, 1, 0$, respectively, whereby, when $p$ primary command pulses have passed through said switch and been applied to said function generator, the value of said function $x$ is obtained in said memory of address, 0, and also the value $x$ is represented by the sum of the number of said secondary command pulses, a signal generator receiving said secondary command pulses and generating in response thereto a value $v$ varying exponentially with respect to the value of said function $x$, said signal generator including first and second registers loaded with a value corresponding to said signal $V_r$ and a value proportional to said signal $V_r$, respectively, as initial values, a memory storing a constant value and a detector which detects the increment of the content of said first register at each time said secondary command pulse produced by said detector of said function generator is applied to said signal generator and produces tertiary command pulses corresponding in number to said increment of the content of said first register, said signal generator being operative in response to each of said secondary command pulses applied thereto to add the content of said second register to the content of said first register, and, in response to each of said tertiary command pulses produced by said detector of said signal generator, to add the content of said memory to the content of said second register, whereby the value $v$ is obtained in said first register when $x$ secondary command pulses have been applied to said signal generator, a comparator comparing the value $v$ obtained in said first register of said signal generator with the value of said electrical signal $V_m$, and producing a coincidence signal when said value $v$ becomes equal to said signal $V_m$, means to turn said switch off to stop further passage therethrough of said primary command pulses in response to said coicidence signal produced by said comparator, and a counter counting the number of primary command pulses applied to said function generator through said switch, the altitude to be measured being obtained in said counter.

4. A barometric altimeter comprising:

means for generating an electrical signal $V_r$ representing the atmospheric pressure at a reference altitude, means including a pressure sensor for generating an electrical signal $V_m$ responsive to the atmospheric pressure at the altitude to be measured, means for supplying primary command pulses, a switch connected to said supplying means, means for turning said switch on to initiate measurement of altitude, said switch, when on, passing said primary command pulses therethrough, a function generator receiving said primary command pulses passed through said switch and responsive thereto for generating a function $x$ expressed by a logarithmic function of a variable which varies linearly with said number of primary command pulses $p$ passed through said switch, said generator comprising first and second registers both loaded with 0 for initial values, a first memory storing a constant value which is related to the known characteristics of the pressure sensor, and a second memory storing a constant value, a detector which detects the increment of the content of said first register each time a primary command pulse is applied to said function generator and produces secondary command pulses corresponding in number to said increment of said content of said first register said function generator being operative in response to each of said primary command pulses passed through said switch and applied thereto, to add the content of said first memory to the content of said first register and to add the content of said second memory to the content of said second register, and being operative in response to each of said secondary command pulses produced by said detector, to add the content of said second register to the content of said first register, whereby, when p primary command pulses have been applied to said function generator, the value $x$ is obtained in said first register and also the value $x$ is represented by the sum of the number of said secondary command pulses, a signal generator for generating the value $v$ varying exponentially with respect to the value of said function $x$, and comprising a shift register loaded with an initial value corresponding to said electrical signal $V_r$, a complementer, a delay circuit and an adder, the output of said shift register being connected to the input of said complementer and also to the input of said delay circuit, and the output of said complementer being connected to one of the inputs of said adder, and the output of said delay circuit being connected to the other input of said adder, and the output of said adder being connected to the input of said shift register, said signal generator responding to each of said secondary command pulses produced by said detector of said function generator, to read out the contents of said shift register to the inputs of said complementer and said delay circuit, and to rewrite the contents of said shift register with the output of said adder one time, whereby said value $v$ is obtained in said shift register, a comparator comparing the value $v$ obtained in said shift register of said signal generator with said electrical signal $V_m$, and producing a coincidence signal when said value $v$ becomes equal to said signal $V_m$, means to turn said switch off to stop passage therethrough of said primary command pulses in response to said coincidence signal produced by said comparator, and a counter counting the number of primary command pulses applied to said function generator through said switch, the altitude to be measured being represented by the count obtained in said counter.

5. A barometric altimeter comprising:

means for generating an electrical voltage $V_r$ representing the atmospheric pressure at a reference altitude, means including a pressure sensor for generating an electrical voltage $V_m$ responsive to the atmospheric pressure at the altitude to be measured, means for generating a train of command pulses, a signal generator for generating an electrical voltage $v$ and comprising a capacitor having a high potential terminal and a low potential terminal, means for charging said capacitor with said voltage $V_r$ at the time of starting a measurement, a resistor, a switch, a control circuit, and a detector, one terminal of said resistor being connected to said high potential terminal of said capacitor and the other terminal of said resistor being connected to one terminal of said switch, the other terminal of said switch being connected to said low potential terminal of said capacitor, said control circuit comprising first and second registers both loaded with O at the time of start of a measurement, and a first memory storing a constant value which, in combination with the capacity of said capacitor, is related to the known characteristics of the pressure sensor, and a second memory storing a constant value, said detector detecting the increment of the content of said first register each time a command pulse is received by said control circuit and producing secondary command pulses corresponding in number to said increment of said content of said first register, and said control circuit being responsive to each command pulse of the train of command pulses applied thereto after the start of a measurement, to add the content of said first memory to the content of said first register, and to add the content of said second memory to the content of said second register, and in response to each of said secondary command pulses produced by said detector, to add the content of said second register to the content of said first register, and said switch is responsive to each of said secondary command pulses to turn on for a predetermined short time interval for discharging the electrical charge stored in said capacitor during said short time interval through said resistor and said switch, the voltage between said high potential terminal and said low potential terminal of said capacitor thereby resulting comprising said electrical voltage $v$, a comparator comparing said voltage $V_m$ and said voltage $v$, and generating an electrical signal when coincidence thereof is detected, and a counter counting at a predetermined frequency and means for starting the counting of said counter at the start of a measurement and for stopping the counting thereby in response to said signal generated by said comparator, the count thereby obtained in said counter representing the altitude measurement.

6. A barometric altimeter comprising:

means for generating an electrical voltage $V_r$ representing atmospheric pressure at a reference altitude, means including a pressure sensor for generating an electrical voltage $V_m$ responsive to the atmospheric pressure at the altitude to be measured, a signal generator generating an electrical voltage $v$, and including a capacitor having a high potential terminal and a low potential terminal, means for charging said capacitor with said voltage $V_r$ at the time of start of a measurement of altitude, an electrical network having two terminals, one of which being connected to said high potential terminal of said capacitor and the other of which being connected to said low potential terminal of said capacitor, and comprising a plurality of resistors and a plurality of switches and means for controlling said switches to provide an infinite value of resistance between said high and low potential terminals of said electrical network before the start of a measurement, and to provide a predetermined value of resistance which is related, in combination with the capacity of said capacitor, to the known characteristics of the pressure sensor at the start of a measurement and to provide a resistance value which decreases linearly with time thereafter, the voltage $v$ being the voltage appearing between the high potential terminal and low potential terminal of said capacitor, a comparator comparing said voltage $V_m$ and said voltage $v$ and generating an electrical signal when coincidence is detected, and a counter counting at a predetermined frequency and means for starting the counting of said counter at the start of a measurement and for stopping the counting thereby in response to said signal generated by said comparator, the count thereby obtained in said counter representing the altitude measurement.

7. A barometric altimeter comprising:

means for generating an electrical signal $V_r$ representing the atmospheric pressure at a reference altitude, means including a pressure sensor for generating an electrical signal $V_m$ responsive to the atmospheric pressure at the altitude to be measured, means for generating an electrical signal $v$ varying basically exponentially with time, means for comparing said electrical signal $v$ with said electrical signals $V_r$ and $V_m$ and respectively producing electrical pulses at the corresponding times of coincidence therebetween, $t_r$ and $t_m$, a function generator for generating an output function in accordance with:

$$h_m - h_r = \frac{e^{-2.261 \times 10^{-5} \times \frac{8431}{nT}(t_m - t_r)} - 1}{-2.261 \times 10^{-5}}$$

where $h_m$ = measured altitude and $h_r$ is reference altitude, means for initiating operation of said electrical signal generating means and said function generator simultaneously to operate as a common function of time, means for controlling the operation of said function generator to initiate operation simultaneously with said electrical pulse generated at the earlier of the time $t_r$ or $t_m$ and to terminate operation in response to said electrical pulse occurring at the later of the times $t_r$ and $t_m$, and said function generator providing a measure of the altitude in accordance with the measurement of the time elapsed between the initiation and termination of operations thereof.

* * * * *

UNITED STATES PATENT AND TRADEMARK OFFICE
CERTIFICATE OF CORRECTION

PATENT NO. : 3,958,459
DATED : May 25, 1976
INVENTOR(S) : Naonobu Shimomura

It is certified that error appears in the above-identified patent and that said Letters Patent are hereby corrected as shown below:

Column 9, Equation 31, change "$(b_1 - 1/-b_o) = a_1$" to -- $(b_1 - 1)/b_o = a_1$ --.

Column 10, line 52, change "135 is and 135" to --and 135--.

Column 10, line 53, change "$v = V_r e^{116x}$" to --$v = V_r e^{-x}$ --.

Column 10, line 55, change "$t_4 = 0$" to --$t_r = 0$ --.

Column 11, line 52, change "varies" to --The--.

Column 12, line 7, change "$V_{re}^{-0.001x}$" to --$V_{re}^{-0.0001x}$ --.

Signed and Sealed this

Seventh Day of September 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,958,459
DATED : May 25, 1976
INVENTOR(S) : Naonobu Shimomura

It is certified that error appears in the above-identified patent and that said Letters Patent are hereby corrected as shown below:

Column 3, line 10, change "shows" to --show--.

Column 3, equation (5), change "$V=V_0 e^{-\frac{t}{T}}$" to --$v=V_0 e^{-\frac{t}{T}}$--.

Column 4, line 27, delete "v".

Column 4, line 28, delete "interval the value" and substitute therefor --interval in which the value v--.

Column 6, lines 4 and 5, change "compound" to --command--.

Column 6, equation 17, change "$p=19,062.5(t_m-t_r/nT$" to --$p=19,062.5(t_m-t_r)/nT$--.

Column 7, line 6, change "register 6" to --register 61--.

Column 7, line 60, before "available" insert --is also--.

Column 8, line 10, change "equations" to --equation--.
Column 8, line 12, change "the form:" to --form--.
Column 9, line 46, change "from" to --form--.

Column 9, equation 31, change "$(b_1-1/b_0)=a_1$" to --$(b_1-1)/-b_0=a_1$--.

Column 10, line 36, after "primary" insert --command--.

Column 10, line 52 delete "135 is and 135" and substitute therefor --and 135 is a--.

Column 12, line 7, change "$V_{re}-0.001x$" to --$V_r e^{-0.0001x}$--.

Column 14, equation (56) correct the equation to read as follows:

$$\frac{\frac{\Delta x}{2f}}{\Delta t} = \frac{b}{2} \frac{1}{1-\beta ft}$$

Column 15, line 9, change "V" to --v--.

Signed and Sealed this

Twenty-sixth Day of October 1976

[SEAL]

Attest:

RUTH C. MASON
Attesting Officer

C. MARSHALL DANN
Commissioner of Patents and Trademarks